United States Patent [19]
Bailes et al.

[11] Patent Number: 4,601,834
[45] Date of Patent: Jul. 22, 1986

[54] SETTLING OF LIQUID DISPERSIONS

[75] Inventors: Philip J. Bailes, Baildon; Samuel K. L. Larkai, Bradford, both of England

[73] Assignee: University of Bradford, Bradford, England

[21] Appl. No.: 538,940

[22] Filed: Oct. 4, 1983

Related U.S. Application Data

[63] Continuation of Ser. No. 316,567, Oct. 30, 1981, abandoned.

[30] Foreign Application Priority Data

Nov. 1, 1980 [GB] United Kingdom ................ 8035196
Aug. 3, 1981 [GB] United Kingdom ................ 8123653

[51] Int. Cl.⁴ .......................................... B01D 17/06
[52] U.S. Cl. .................................. 210/748; 210/708; 210/800
[58] Field of Search ............... 210/748, 243, 800, 799, 210/708

[56]  References Cited

U.S. PATENT DOCUMENTS 4,226,690 10/1980 Martin ................................. 204/190
4,283,290 8/1981 Davies ............................ 210/748 X
4,290,882 9/1981 Dempsey ........................ 210/748 X

FOREIGN PATENT DOCUMENTS 13465 of 1914 United Kingdom .
1582040 12/1980 United Kingdom .

Primary Examiner—Thomas Wyse
Attorney, Agent, or Firm—Bert J. Lewen; Henry Sternberg

[57]  ABSTRACT

Apparatus for aiding the separation of the components of a liquid dispersion comprises at least one pair of electrodes, arranged so as to be able to apply a unidirectional, varying electric field across at least a portion of a flow path 5a of the dispersion, at least one of the or each pair of electrodes being separated from the dispersion by a layer of electrically insulating material.

A method for aiding the separation of the components of a liquid dispersion is also described.

9 Claims, 3 Drawing Figures

SETTLING OF LIQUID DISPERSIONS

This is a continuation of application Ser. No. 316,567 filed Oct. 30, 1981, abandoned.

The present invention relates to methods and apparatus for settling liquid dispersions or emulsions and particularly separating two immiscible or partially miscible liquids.

There are many processes in which it is necessary to separate out the components of a liquid/liquid dispersion, for example, the separation of water droplets from petroleum derivatives or oil and the extraction of a metal ion from an aqueous phase into an organic phase. Where the densities of the liquids are sufficiently different then the separation can be effected in settling tanks. The denser liquid or phase simply sinks below the less dense phase and given sufficient time the two phases can be separated sufficiently to be drawn off. However, such a process requires the use of large tanks taking up a correspondingly large amount of space and, at least for solvent extraction processes, typing up a large volume of expensive solvent. Furthermore, this separation procedure may be the slowest stage of a more extensive process and therefore determine the throughput of the complete process.

It is known that the application of an electrostatic field can speed up the separation of a dispersion, including an emulsion, into its components, where the continuous phase of the mixed liquids is an electrical insulator and the dispersed phase is an electrical conductor. The use of a.c. fields has been proposed, the frequency of the alternating current being mains frequency, i.e. 50 to 60 hertz (Hz), or a frequency greater than mains frequency.

The use of pulsed d.c. fields has also been proposed, the frequency of such fields being of the order of 10 kilohertz (kHz).

For both the a.c. and the d.c. apparatus the field strengths have been of the order of several kilovolts per cm.

The use of electrodes coated with insulating material has also been suggested in connection with high voltage a.c. fields.

The equipment required to produce such high frequency and high strength electric fields across the dispersion is expensive and complicated. Furthermore, the generation of high voltages is inherently unsafe in the inflammable atmosphere often associated with processes within the field of the present invention.

According to the present invention there is provided apparatus for aiding the separation of the components of a liquid dispersion, the apparatus comprising means for passing said dispersion along a flow path, and at least one pair of electrodes for applying a unidirectional, varying electrostatic field across at least a portion of the flow path, at least one of the or each pair of electrodes being arranged so that, in use, it is separated from the dispersion by a layer of insulating material.

The present invention also provides a method for aiding the separation of the components of a liquid dispersion, the method comprising passing said dispersion along a flow path and applying by means of at least one pair of electrodes a unidirectional, varying electrostatic field across at least a portion of the flow path, at least one of the or each pair of electrodes being arranged so that it is separated from the dispersion by a layer of insulating material.

The invention involves the combination of three factors to give an unexpected and highly efficient method of liquid phase separation. The factors are firstly that the electric field applied across the dispersion must be unidirectional. Secondly, this field must be fluctuating, for instance, regular or irregular variation of the voltage level. Preferably the variation is periodic and more preferably pulsed between zero voltage and some appropriate high voltage at a predetermined constant frequency. Finally, the high voltage electrode or both electrodes must be separated from the dispersion and thereby prohibited from contacting the dispersion by a layer of insulating material, for example, perspex or air.

Preferably, the liquid dispersion is a dispersion of one or more electrically conducting liquids in one or more less electrically conducting liquids. More preferably the liquid dispersion is a dispersion of an electrically conducting liquid in an electrically insulating liquid. The apparatus is particularly well-suited to the treatment of dispersions where the volume of conducting liquid as a percentage of the total volume of dispersion is high, for example, 50%.

The use of an electrically insulating material on the electrodes reduces the loss of charge which can occur by short-circuiting through the dispersion. Accordingly it is possible to operate the process on dispersions having a relatively large proportion of conducting material in the dispersion, without an excessive leakage current from the electrodes.

The degree of liquid phase separation within the apparatus is controlled by the frequency and magnitude of said variation of the electrostatic field.

At values of the electric field strength across the flow path of said mixture of liquids below 1000 volts per cm the effect of frequency is pronounced.

The frequency at which the electric field is varied can have a specific value for which phase separation is optimum. This optimum frequency depends on the thickness and electrical properties of the electrode insulation and on the properties of the dispersion that is being treated. However, typically a preferred frequency of variation of the electrostatic field is between 30 Hz and 1 Hz. More preferably it is between 20 Hz and 1.5 Hz and most preferably it is between 15 Hz and 2 Hz. It should be appreciated, however, that the optimum frequency may well lie outside the above preferred ranges, and in any case good results may be obtained at frequencies other than the optimum frequency.

Typically for voltage gradients in the dispersion flow path of 300 volts per cm and below, the phase separation performance can be expected to be very sensitive to the frequency of the electric field fluctuation. For any particular operating voltage there is an optimum frequency, where the operating voltage is above or below 300 volts per cm.

In general the higher the voltage the better the separation of the phases, but it is preferred to use the lower voltages having regard to factors such as safety, capitol costs and operating costs. Having regard to these factors the preferred electric field strength across the flow path is below 1100 volts per cm. More preferably it is below 500 volts per cm and most preferably it is below 100 volts per cm.

Accordingly apparatus in accordance with the present invention effects separation of the components of a dispersion at much lower frequencies than had previously been considered. Furthermore separation at much lower frequencies has led to the appreciation that dispersions can be efficiently separated into their component liquids at field strengths far below those previously employed. Furthermore the equipment is safer to operate because of the avoidance of very high voltages in an environment in which flammable organic materials are likely to be present.

This invention also provides a process for aiding the separation of the components of a liquid dispersion, the process comprising passing the dispersion along a flow path, and applying across at least a portion of the flow path a varying electrostatic field.

Apparatus and processes in accordance with the present invention may be used in many situations where a mixture of two or more liquids is to be separated into its component liquids. Examples are as follows:

1. A solvent extraction process in which a metal ion is to be extracted from aqueous solution. The aqueous medium is intimately mixed with an organic solvent in which may be incorporated an agent for extracting the metal ion.
2. The separation of water droplets from petroleum derivatives or oil.
3. Aromatic and aliphatic hydrocarbons having similar molecular weights may be treated using selective solvents which are relatively polar, examples being Sulfolane and N-methylpyrrolidone in order to extract high purity aromatic hydrocarbons for the petrochemical industry. The hydrocarbon and solvent phases are partially miscible and need to be separated after extraction.
4. The separation of the components of liquid membrane systems.

Apparatus in accordance with the present invention may be used alone or in conjunction with a settling tank depending upon the degree of separation effected by the application of the electrostatic field. In one arrangement a dispersion may be passed along a duct between a pair, or a plurality of pairs, of electrodes and then fed from the duct into a settling tank which may be provided with one or more baffles positioned close to the point of entry of the liquid mixture into the tank in order to reduce the turbulence in the tank. Each separated liquid phase can be drawn off at an appropriate rate in order to keep the total volume of the liquid in the tank substantially constant.

An example of apparatus in accordance with the present invention will now be described by way of example only and with reference to the accompanying drawings, in which.

Figure 1:
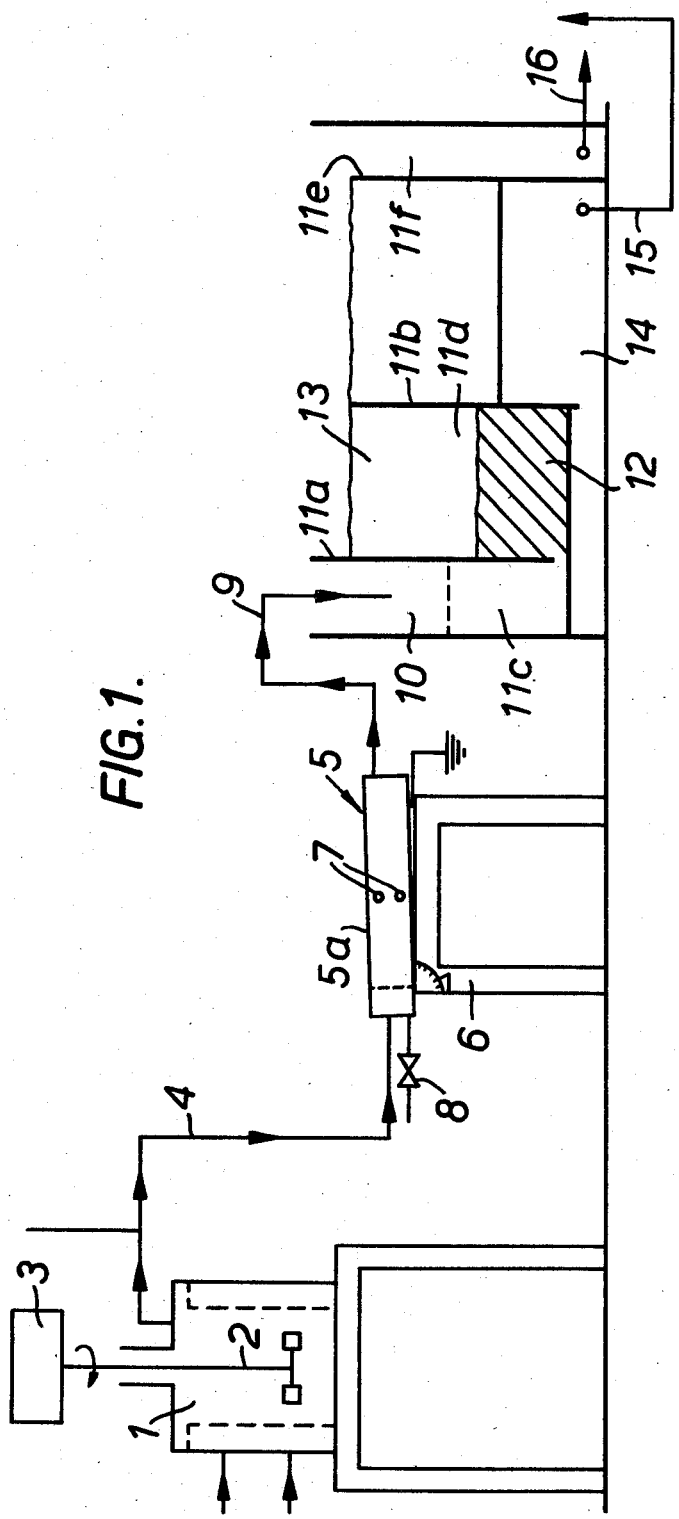
FIG. 1 is a diagrammatic representation of apparatus in accordance with the present invention.

Referring to FIG. 1, apparatus in accordance with the present invention comprises mixer container 1 into which the two immiscible liquids are fed. The liquids are intimately mixed by agitator 2 driven at high speed by mixer motor 3. The resultant dispersion is then fed through a tube 4 into an electrostatic coalescer 5. Coalescer 5 includes a shallow perspex "duct" 5a which is approximately square in plan and which is located on a support 6 so as to be inclined gently upwards in the direction of the liquid flow. Metal plates (not shown) are located on the exterior surface of the top and the interior surface of the base of the duct 5a, the upper metal plate being charged and the lower metal plate being earthed. Extending into the duct 5a through a side wall thereof are two probes 7 which are connected via a resistor bank to a suitable cathode ray oscilloscope so that the electric field inside the duct may be measured and/or monitored. Below the feed duct 4 is drain valve 8. This may be used to drain the contents of the coalescer at shut down and could be used to remove coalesced aqueous or conducting phase in order to keep the surface of the aqueous phase at a constant level in the duct. At the other end of the duct 5a is exit pipe 9 leading to a settler tank 10.

Tank 10 has located therein vertical baffles 11a and 11b which define portions 11c and 11d of the tank. Within portion 11c the turbulence of the liquid being fed into the tank through tube 9 is dissipated. In portion 11d there is, during operation of the apparatus, set up a steady state position in which dispersion 12 lies between organic phase 13 and aqueous phase 14. The depth of dispersion 12 may be used as a measure of the effectiveness of the apparatus in achieving separation of the dispersion into its component phases. The smaller the depth of the dispersion the more effective is the electrostatic coalescer 5.

A further baffle 11e allows organic phase 13 to accumulate in portion 11f of tank 10 and to be led off therefrom through pipe 16. Aqueous phase may be led off from a central portion of the tank between baffles 11b and 11e through pipe 15.

Figure 2:
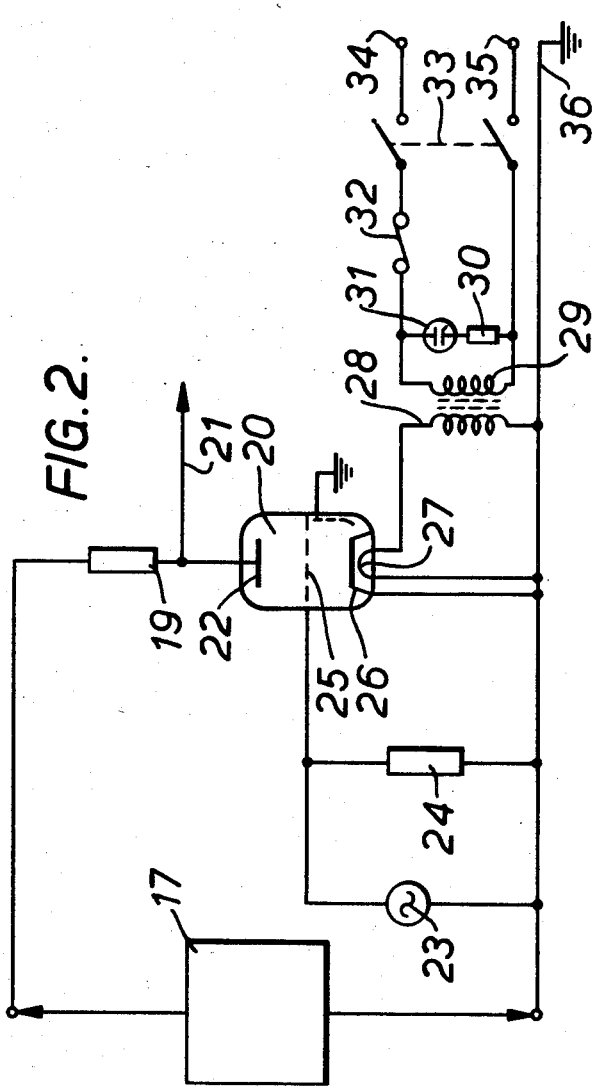
FIG. 2 shows the electrical circuit used in the apparatus of FIG. 1.

The electrical circuit used to charge up plate 5 of the electrostatic coalescer is shown in FIG. 2. In this circuit a variable supply from an EHT generator of up to 15 kilovolts is alternately switched on and off by means of a shunt stabilised triode 20 as used in colour television EHT valves. The grid of the triode is connected to a signal generator 23 with a range of frequencies of from 0.5 to 60 hertz, the generator being in parallel with a 1 M$\Omega$ resistor 24. The cathode 26 of the valve is connected to earth and is heated by a 7.3 volt a.c. heater 27. The anode 22 of the valve is connected in series with a 100 M$\Omega$ resistor 19 and thence to the EHT input. The voltage on the anode is fed via line 21 to the top plate of the electrostatic coalescer 5.

It will be appreciated that the supply to the triode heater 27 can be derived by any suitable means. However, in this embodiment of the present invention the heater supply is derived from an a.c. main supply of the standard 240 V, 50 Hz. In FIG. 2, terminal 34 is the live terminal, terminal 35 is neutral and 36 is earth. The lead from the live terminal 36 is taken to a first terminal of the primary winding 29 of a 7.3 V a.c. 0.3A transformer, via a main ON/OFF switch 33 and a 1A fuse 32 in series with the live supply lead. The second terminal of the primary winding 29 of the transformer is led via a second pole of the previously mentioned ON/OFF switch 33 to the neutral terminal 35.

In parallel with the primary winding 29 of the transformer, across the live and neutral supply leads, are an indicator neon lamp 31 and a current limiting 270 K$\Omega$ resistor 30. When switch 33 is closed, connecting the primary winding 29 to the mains supply terminals 34 and 35, lamp 31 is lit, indicating that switch 33 is in the ON position.

Comprising the remainder of the transformer assembly is an iron core and secondary winding 28. A first terminal of secondary winding 28 is connected to earth rail 36. The second terminal of secondary winding 28 is connected to a first terminal of triode heater element 27, the second terminal of heater element 27 being connected to earth rail 36.

It will be appreciated that the connection of the mains a.c. supply to primary winding 29 induces an a.c. voltage across secondary winding 28 of, in this case, 7.3 V. This causes an alternating current to flow through heater element 27, thus generating heat energy which may be transmitted to electrons on cathode 26.

Figure 3:
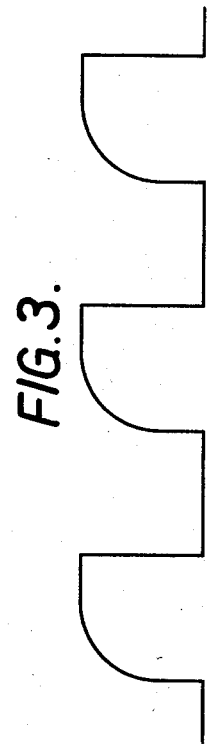
FIG. 3 illustrates the nature of the pulsed D.C. field applied to a dispersion by apparatus in accordance with the invention.

The above-described control circuit for the electrostatic coalescer operates to connect the top plate electrode alternately to ground, via the triode valve, and to the supply from the EHT generator. The result is that a pulsed d.c. unidirectional current is delivered to this electrode, the pulses being of substantially square wave form (see FIG. 3).

Examples of dispersions, whose separation into component liquid phases may be accelerated by the above-described apparatus are as follows:

1. A dispersion comprising equal parts of organic and aqueous phases, the organic phase being 40% cyclohexanol and 60% ESCAID 100 (a commercial kerosene diluent which is a product of Exxon) and the aqueous phase being water. The viscosity of the organic phase is 2.852 centipoises at 25° C. and its specific gravity is 0.853. The viscosity of the aqueous phase is 0.896 centipoises at 25° C. and the specific gravity 1.000.
2. A dispersion comprising equal parts of organic and aqueous phases, the organic phase being 20% LIX 64N (so- called "liquid ion exchange" extractant made by Henkel Corporation) and 80% ESCAID 100 and the aqueous phase is a solution of 2 g/l sulphuric acid in water. the viscosity of the organic phase is 1.953 centipoises at 25° C. and its specific gravity is 0.809. The viscosity of the aqueous phase is 0.888 centipoises and its specific gravity is 1.0025.

Table 1 illustrates the results obtainable using the above-described apparatus on the second of the dispersions described above.

TABLE 1

| PEAK ELECTRIC FIELD STRENGTH v/cm | FREQUENCY Hz | REDUCTION IN DISPERSION BAND DEPTH % |
|---|---|---|
| 40 | 0.5 | 30.9 |
|  | 1.0 | 50.4 |
|  | 2.0 | 66.3 |
|  | 4.0 | 71.4 |
|  | 6.0 | 75.6 |
|  | 8.0 | 76.10 |
|  | 10.0 | 71.00 |
|  | 20.0 | 48.8 |
|  | 30.0 | 29.3 |
|  | 40.0 | 15.8 |
|  | 50.0 | 5.3 |
|  | 60.0 | 1.0 |
| 80 | 0.5 | 35.8 |
|  | 1.0 | 64.8 |
|  | 2.0 | 82.3 |
|  | 4.0 | 85.7 |
|  | 6.0 | 86.1 |
|  | 8.0 | 86.5 |
|  | 10.0 | 84.1 |
|  | 20.0 | 78.0 |
|  | 30.0 | 73.4 |
|  | 40.0 | 60.9 |
|  | 50.0 | 39.2 |
|  | 60.0 | 21.8 |
| 40 | 8.0 | 76.10 |
| 80 | 8.0 | 86.5 |
| 120 | 8.0 | 89.8 |
| 200 | 8.0 | 91.6 |
| 300 | 8.0 | 96.2 |

TABLE 1-continued

| PEAK ELECTRIC FIELD STRENGTH v/cm | FREQUENCY Hz | REDUCTION IN DISPERSION BAND DEPTH % |
|---|---|---|
| 550 | 8.0 | 97.6 |
| 700 | 8.0 | 97.65 |
| 850 | 8.0 | 98.0 |
| 1000 | 8.0 | 99.4 |
| 1000 | 1.0 | 98.3 |
|  | 8.0 | 99.4 |
|  | 60.0 | 98.1 |

The peak electric field values given in Table 1 are those obtaining inside duct 5a as measured by the probes 7. The reduction in dispersion band depth is the ratio, expressed as a percentage, of the depth of dispersion 12 in tank 10 when the electrostatic field is applied across duct 5a to the depth when the field is not so applied.

It can be seen from Table 1 that for electric fields 40 and 80 V/cm the maximum reduction in dispersion band depth is obtained at a frequency of 8 Hz. Although the reduction in dispersion band depth at a given frequency at 8 Hz does increase with increasing electrostatic field, a very large reduction in band depth is achieved at electrostatic field strengths as low as 40 V/cm. Such a low electrostatic field strength may be achieved in the above-described apparatus with a voltage level applied to the charged electrode as low as 200 volts and there is therefore no need for a high voltage generator in order to reach such voltages. It is also apparent from Table 1 that at an electric field strength of 1000 v/cm the results for 1 Hz, 8 Hz and 60 Hz are nearly the same and very satisfactory.

The data given in Table 1 are for a duct 5a for which the perspex sheet forming the top of the duct is 6 mm in thickness. The upper electrode is effectively separated from the dispersion by an insulating coating 6 mm thick. Perspex coatings of 3 mm and 10 mm employed with the same liquid-liquid dispersion show lower and higher optimum frequencies, respectively. The values obtained are given in Table 2.

Apparatus in accordance with the present invention may or may not include a settling tank of a size appropriate for the process in which the apparatus is to be used. Having regard to the extent of settling achieved by the application of the electrostatic field, such a settling tank where it is included can be of substantially smaller capacity than those which would have been necessary without the use of the electrostatic field to effect precoalescing of the dispersed phase.

TABLE 2

| THICKNESS OF ELECTRODE COATING mm | OPTIMUM FREQUENCY Hz |
|---|---|
| 3.0 | 5.0 |
| 6.0 | 8.0 |
| 10.0 | 12.5 |

Apparatus in accordance with the present invention may, instead of including its own settling tank, be added to existing equipment including settling tanks. The addition of such apparatus will enable the settling stage of the overall process to be effected very much more rapidly for a given throughput, and in practice the throughput of the overall process can be greatly increased.

Apparatus in accordance with the present invention when added to existing equipment including settling tanks may take a form where one electrode is suspended above said equipment, insulated from the liquid contents by air or an inert gaseous atmosphere.

In an alternative embodiment of the invention the fluctuating unidirectional electrostatic field can be applied between suitably insulated wires immersed in the flow path of the dispersion, the electrical connections and spatial arrangement of said wires being such that they form a plurality of pairs of electrodes.

It is found that the shape of the pulse has little effect on the efficiency of the electrostatic coalescer. Triangular, square and sine waves have been applied to the electrodes of the coalescer 5 but, because of the time delays introduced by the perspex wall of the coalescer duct, the wave form of the pulse inside the duct has been found to be in all cases a distorted and rounded square wave.

We claim:

1. A method for aiding the separation of the components of a liquid dispersion, the method comprising passing said dispersion along a flow path, and applying by means of at least one pair of electrodes, a unidirectional electrostatic field which has a field strength below 1100 V/cm and is pulsed at a predetermined frequency up to 60 Hz across at least a portion of the flow path, wherein the electrode of each pair of electrodes to which the high voltage is applied is separated along its entire length from the dispersion by a layer of electrically insulating material.

2. A method according to claim 1 wherein the dispersion is one of at least one electrically conducting liquid in one or more liquids of relatively lower electrical conductivity.

3. A method according to claim 1 wherein the voltage across the electrodes pulses at a frequency of from 1.5 to 20 Hz, a field strength below 500 V/cm.

4. A method according to claim 1 wherein said voltage across the electrodes pulses at a frequency between 1 Hz and 30 Hz.

5. A method according to claim 1 wherein said electrical field strength across the flow path is below 500 V/cm.

6. A method according to claim 1 also comprising settling the components of the dispersion into discrete phases in a settling tank.

7. The method of claim 1 wherein the predetermined frequency is at least 0.5 Hz.

8. The method of claim 1 wherein the predetermined frequency is between 1 and 30 Hz and the field strength is below 500 volts/cm.

9. A method for aiding the separation of components of a liquid dispersion, comprising passing a liquid dispersion whose components have different electrical conductivities along a flow path through a vessel, and applying a pulsed electrostatic field below 500 volts/cm at a predetermined frequency of from 1.5 to 20 Hz across at least a portion of the flow path, wherein the electrode of each pair of electrodes to which the high voltage is applied is separated along its entire length from the dispersion by a layer of electrically insulating material having a thickness of from 3 to 10 mm, and settling the components of the dispersion into their different phases at a location downstream of the vessel.

* * * * *